US012691959B2

(12) United States Patent
Bona

(10) Patent No.: US 12,691,959 B2
(45) Date of Patent: Jul. 28, 2026

(54) TRACKED VEHICLE

(71) Applicant: CONTERNO & BONA S.R.L.,
Monforte d'Alba (IT)

(72) Inventor: Federico Bona, Monforte d'Alba (IT)

(73) Assignee: BLACKSHIRE S.R.L., Monforte
d'Alba (IT)

( * ) Notice: Subject to any disclaimer, the term of this
patent is extended or adjusted under 35
U.S.C. 154(b) by 712 days.

(21) Appl. No.: 18/014,852

(22) PCT Filed: Jul. 8, 2021

(86) PCT No.: PCT/IB2021/056146
§ 371 (c)(1),
(2) Date: Jan. 6, 2023

(87) PCT Pub. No.: WO2022/009146
PCT Pub. Date: Jan. 13, 2022

(65) Prior Publication Data
US 2023/0286601 A1 Sep. 14, 2023

(30) Foreign Application Priority Data
Jul. 9, 2020 (IT) ........................ 102020000016738

(51) Int. Cl.
B62D 55/116 (2006.01)
B62D 55/06 (2006.01)
(Continued)

(52) U.S. Cl.
CPC ............ B62D 55/116 (2013.01); B62D 55/06
(2013.01); B62D 55/15 (2013.01); B60G
2300/32 (2013.01); B62D 55/10 (2013.01)

(58) Field of Classification Search
CPC ...... B62D 55/116; B62D 55/06; B62D 55/15;
B62D 55/10; B60G 2300/32
(Continued)

(56) References Cited

U.S. PATENT DOCUMENTS 5,409,305 A * 4/1995 Nagorcka .............. B62D 55/15
305/153
6,662,421 B1 * 12/2003 Krippelz, Sr. ......... B62D 55/32
29/559
(Continued)

FOREIGN PATENT DOCUMENTS

CN 107697174 A 2/2018
CN 108974163 A 12/2018
(Continued)

OTHER PUBLICATIONS

International Search Report and Written Opinion issued in connection with Application No. PCT/IB2021/056146, dated Oct. 8, 2021 (13 pages).
(Continued)

*Primary Examiner* — Valentin Neacsu
*Assistant Examiner* — Mohamed M Medani
(74) *Attorney, Agent, or Firm* — KLINTWORTH &
ROZENBLAT LLP

(57) ABSTRACT
A tracked vehicle, in particular for use in agriculture, has a chassis extending along a longitudinal axis; two carriages, which are arranged on opposite sides of the chassis, are configured to support respective tracks and are articulated to the chassis about a pitch axis; and two shock absorbers, each of which is connected to the chassis and to a respective carriage and is adjustable in position to control the position of the respective carriage with respect to the chassis.

5 Claims, 4 Drawing Sheets

(51) Int. Cl.
    *B62D 55/10*           (2006.01)
    *B62D 55/15*           (2006.01)

(58) Field of Classification Search
    USPC ........................................................ 180/9.52
    See application file for complete search history.

(56) References Cited

U.S. PATENT DOCUMENTS

| | | | |
|---|---|---|---|
| 2004/0099451 A1 * | 5/2004 | Nagorcka | .......... B62D 55/0842 |
| | | | 180/9.5 |
| 2016/0362150 A1 | 12/2016 | Kirchmair et al. | |
| 2019/0248433 A1 * | 8/2019 | Aubin-Marchand | .. B62D 55/10 |
| 2019/0359269 A1 * | 11/2019 | Hellholm | ............. B60G 21/045 |

FOREIGN PATENT DOCUMENTS

| | | | | |
|---|---|---|---|---|
| EP | 1060978 | | 12/2000 | |
| EP | 1060978 A2 * | | 12/2000 | ......... B62D 55/0655 |
| EP | 1506112 | | 2/2005 | |
| KR | 102144525 B1 * | | 8/2020 | ........... B62D 55/305 |
| WO | WO-2018024758 A2 * | | 2/2018 | ........... B62D 55/108 |

OTHER PUBLICATIONS

First Office Action and Search Report issued in connection with Chinese Patent Application No. 202180049782.6 and machine translation thereof, dated Jul. 31, 2025, 14 pages.

\* cited by examiner

TRACKED VEHICLE

CROSS-REFERENCE TO RELATED APPLICATIONS

This patent application claims priority from Italian patent application no. 102020000016738 filed on Sep. 7, 2020, the entire disclosure of which is incorporated herein by reference.

TECHNICAL FIELD

The invention relates to a tracked vehicle, in particular to handle agricultural equipment.

BACKGROUND ART

The use of tracked vehicles is widespread in agriculture to operate implements configured to work the soil or to eliminate harmful insects or to weed the soil or to harvest crops. The use of tracked vehicles offers better traction than wheeled vehicles, in particular when said vehicles operate on steep and rugged slopes.

However, tracked vehicles suffer from greater problems while steering, since at least one of the tracks is rotated around an axis that is perpendicular to the ground along the entire surface of the track in contact with the ground. Indeed, this action results in a relative sliding between the track segment in contact with the ground, which is particularly harmful for the soil.

Furthermore, both in tracked vehicles and in wheeled vehicles, when faced with obstacles lying on the ground or operating on extremely irregular grounds, the position of the vehicle is subjected to significant changes and, as a consequence, possible equipment transported by the vehicle is subjected to undesired movements.

DISCLOSURE OF INVENTION

The object of the invention is to provide a tracked vehicle that mitigates the drawbacks of the prior art.

According to the invention, there is provided a tracked vehicle, in particular for use in agriculture, the tracked vehicle comprising:

a chassis extending along a longitudinal axis;

two carriages, which are arranged on opposite sides of the chassis and are configured to support their respective tracks and are articulated to the chassis around a pitch axis; and two shock absorbers, each of which is connected to the chassis and to a respective carriage and is adjustable in position to control the position of the carriage with respect to the chassis.

Thanks to the invention, the tracked vehicle allows the shock absorbers to be moved in an independent or synchronous manner in order to control the two carriages according to the circumstances. In case of steering, the contact surface of the track that remains inactive or is operated at a lower speed compared to the speed of the other track can be reduced, thus reducing the slip on the ground and the consumption of energy. In case the tracked vehicle has to get past an obstacle, the carriage or both carriages can be rotated around the pitch axis in order to reduce the movements of the chassis as much as possible.

In particular, each shock absorber is adjustable in stiffness in an independent manner with respect to the adjustment in position.

In particular, each carriage comprises an elongated structure supporting, in a rotary manner and at its opposite ends, a driving wheel and an idle wheel; said elongated structure being articulated to the chassis around said pitch axis, in particular the pitch axis is closer to the driving wheel than to the idle wheel.

This configuration is particularly sturdy and simple to be obtained.

In particular, the rear drive wheel is larger than the front idle wheel so as to maximize the force transmission surface between the driving wheel and the respective track.

In particular, the idle wheel is adjustable along the elongated structure so as to be able to adjust the tension of the tracks.

In particular, the driving wheel comprises two twin driving wheels arranged on opposite sides of the elongated structure and the idle wheel comprises two twin idle wheels arranged on opposite sides of the elongated structure.

This configuration allows the track to be held along a rib of the track in the space between the twin idle wheels and the twin driving wheels.

According to a particular embodiment, the tracked comprises a bridge, which is hinged to the chassis around a first axis, which is parallel to the pitch axis, and to each carriage around a second axis, which is parallel to the pitch axis, by means of respective couplings.

The bridge gives stability to the assembly consisting of the chassis and the carriages and, at the same time, allows the carriages to pitch thanks to the couplings. Basically, the chassis, the bridge and each carriage define a very squashed triangle, whose vertexes are defined by the pitch axis and by the first and the second axis.

In particular, each shock absorber has one end directly coupled to the bridge. In this way, the shock absorbers control the position of the bridge, which, in turn, orientates the carriage or the carriages around the pitch axis.

In particular, the bridge is articulated to the chassis by means of an elastic coupling, which allows the bridge both to rotate around the first axis and to tilt the second axis with respect to the first axis.

By so doing, the carriages can be controlled in an independent manner.

In particular, the bridge is connected to a respective carriage by means of a coupling allowing for deformations in all directions.

In a particular embodiment of the invention, each elongated structure is at least partly hollow. In this way, each elongated structure can at least partly house a respective powertrain system, which is configured to operate a respective driving wheel.

In particular, each powertrain system comprises a respective shaft coinciding with the pitch axis; a mechanical transmission housed in the respective elongated structure in order to connect the shaft to the respective driving wheel; and a respective engine, which is configured to rotate said respective shaft and is housed in a cavity of the chassis.

In particular, said engine is an electric motor.

BRIEF DESCRIPTION OF THE DRAWINGS

Further features and advantages of the invention will be best understood upon perusal of the following description of non-limiting embodiments thereof, with reference to the Figures of the accompanying drawings, wherein.

US 12,691,959 B2

3

Figure 1:
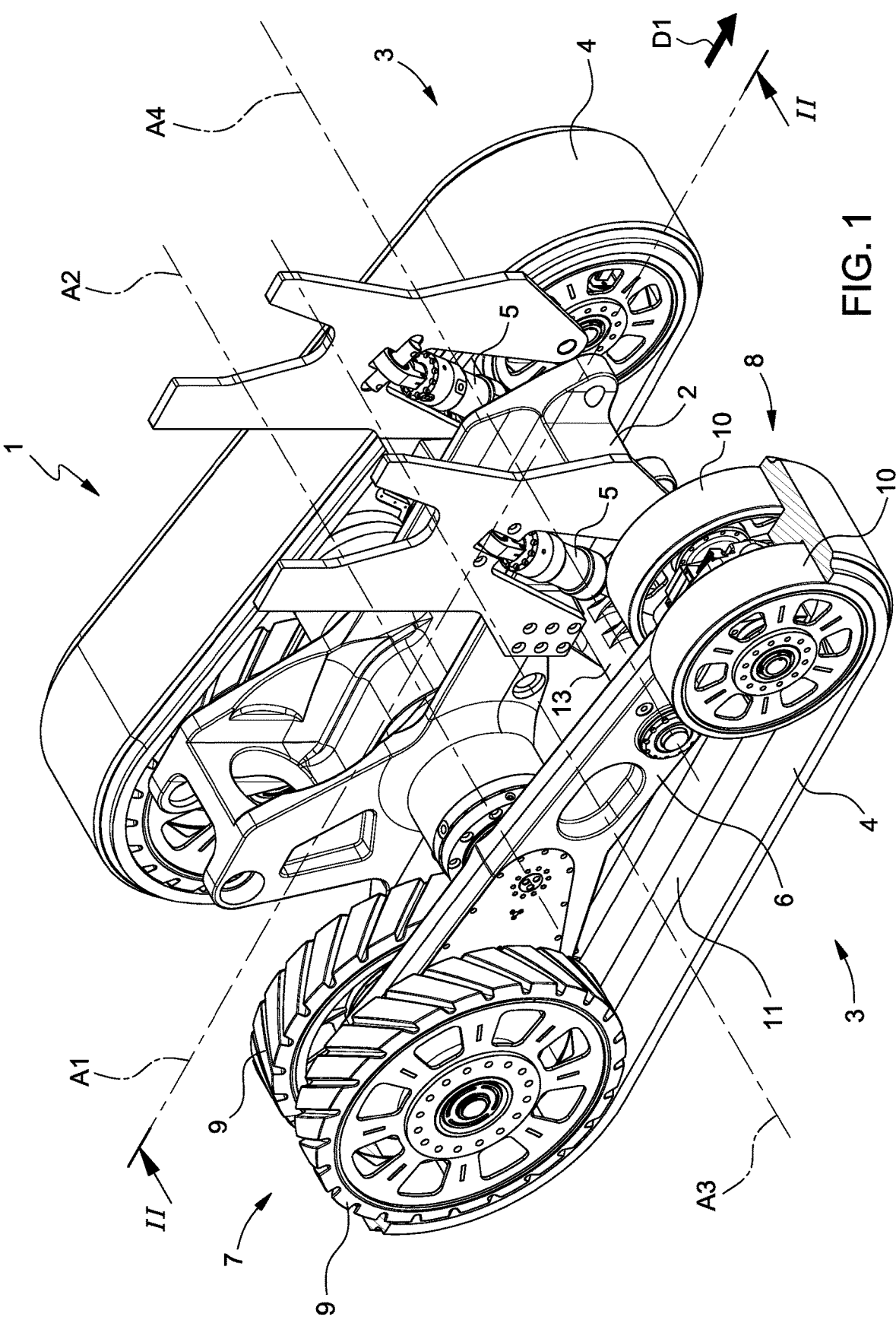
FIG. 1 is a perspective view, with parts removed for greater clarity, of a tracked vehicle according to the invention.
Figure 2:
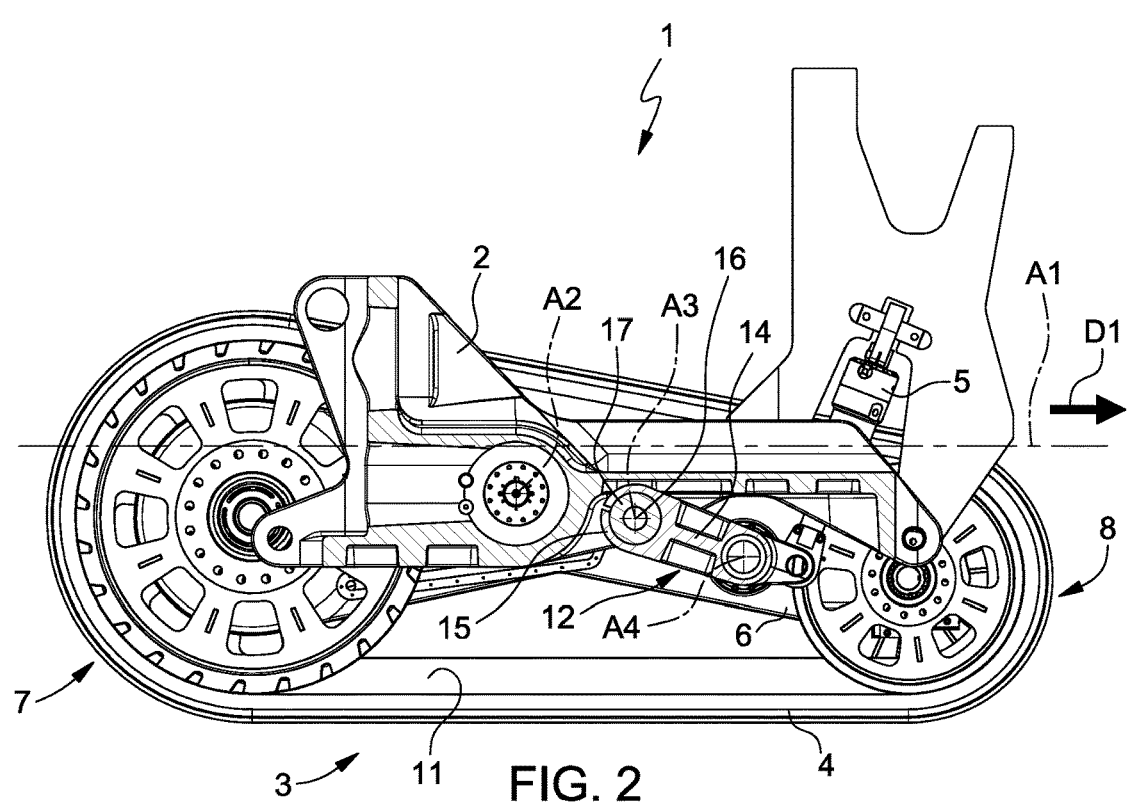
Figure 3:
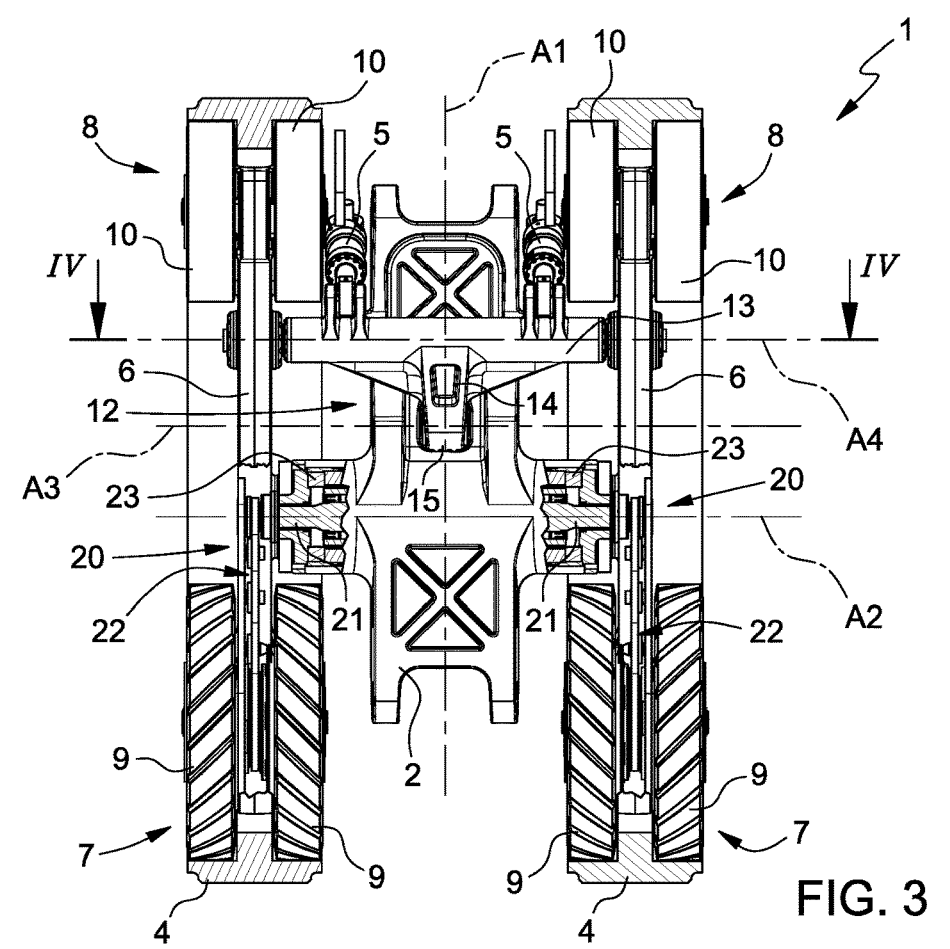
Figures 4, 5, 6, 7:
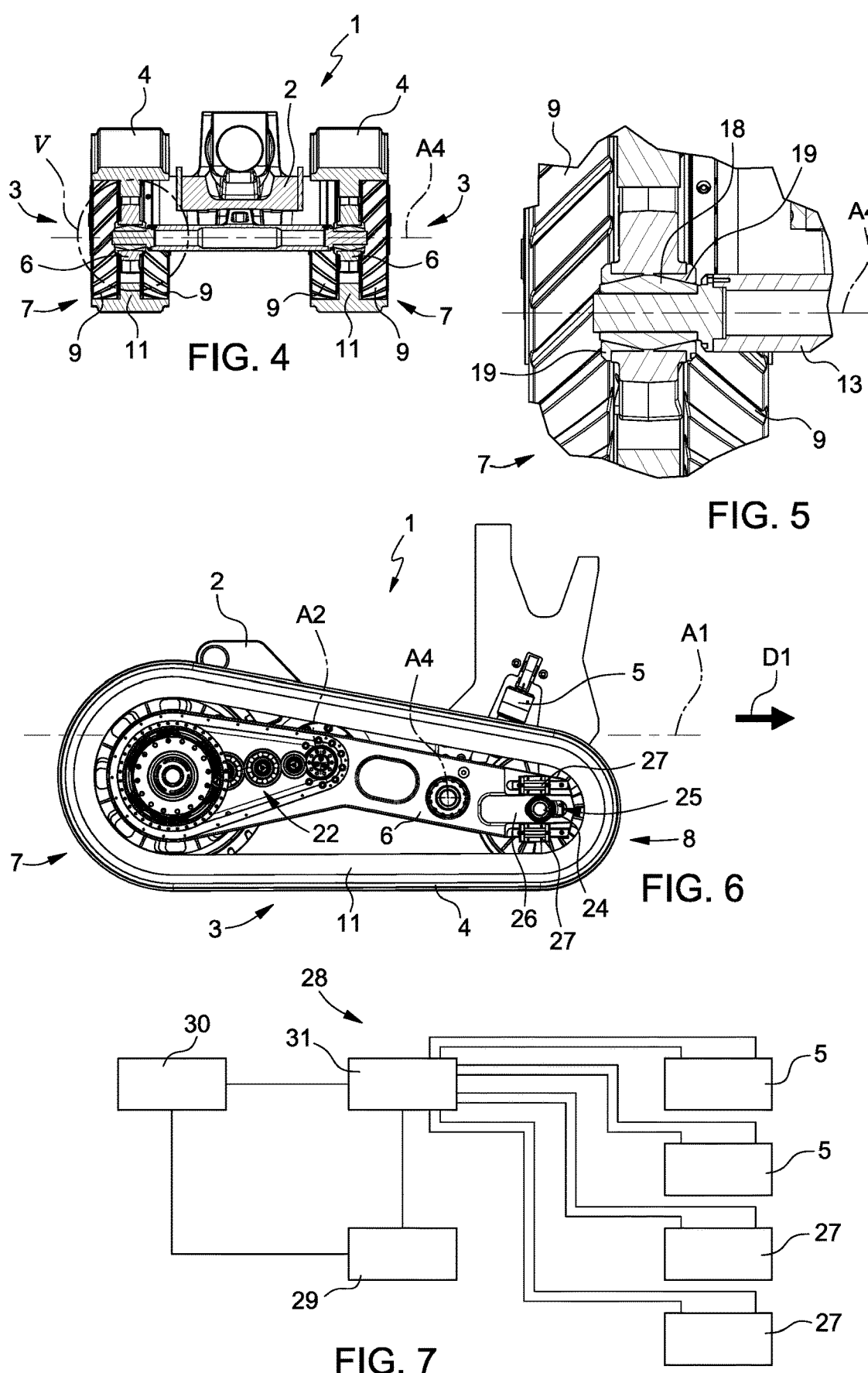

FIG. 2 is a sectional view, with parts removed for greater clarity, of the tracked vehicle of FIG. 1 along section line II-II;

FIG. 3 is a view from the bottom, with parts removed for greater clarity, of the tracked vehicle of FIG. 1;

FIG. 4 is a sectional view, with parts removed for greater clarity, of the tracked vehicle of FIG. 3 along section line IV-IV;

FIG. 5 is a sectional view, with parts removed for greater clarity, of a detail of FIG. 4;

FIG. 6 is a side elevation view, with parts removed for greater clarity, of the vehicle of FIG. 1;

FIG. 7 is a schematic view of a control system of the tracked vehicle of FIG. 1;

FIGS. 8 to 11 are side elevation views, with parts removed for greater clarity, of the vehicle of FIG. 1 in respective operating conditions.

BEST MODE FOR CARRYING OUT THE INVENTION

In FIG. 1, number 1 indicates a tracked vehicle 1, in particular to be used in agriculture and to support equipment, which is not shown in the accompanying Figures. The tracked vehicle 1 is configured to be mainly moved in a moving direction D1, even though, when needed, it can be moved in the direction contrary to the direction D1. The tracked vehicle 1 comprises a chassis 2 extending along a longitudinal axis A1; two carriages 3, which are arranged on opposite sides of the chassis 2, are configured to support respective tracks 4 and are articulated to the chassis 2 around a pitch axis A2; and two shock absorbers 5, each of which is connected to the chassis 2 and to a respective carriage 3 and is adjustable in position and stiffness. Each carriage 3 comprises an elongated structure 6 supporting, at its opposite ends and in a rotary manner, a driving wheel 7 and an idle wheel 8, which rotate around respective axes, which are parallel to the pitch axis A2. Each elongated structure 6 is articulated to the chassis 2 around the pitch axis A2. In particular, the driving wheel 7 is a rear wheel and is larger than the idle wheel 8, which is in a front position and is adjustable along the elongated structure 6 so as to selectively change the tension of the respective track 4. Each driving wheel 7 comprises two twin driving wheels 9, which are arranged on opposite sides of the elongated structure 6. Similarly, each idle wheel 8 comprises two twin idle wheels 10, which are arranged on opposite sides relative to the elongated structure 6. The twin driving wheels 9 are axially spaced apart from one another by a distance. Similarly, the twin idle wheels 10 are spaced apart by the same distance. Each track 4 comprises a rib 11, which extends in a ring shape along the entire length of the track 4 and is arranged between the twin driving wheels 9 and the twin idle wheels 10.

With reference to FIGS. 2, 3 and 4, the tracked vehicle comprises a bridge 12, which is hinged to the chassis 2 around a rotation axis A3, which is parallel to the pitch axis A2, and to each carriage 3 around a second rotation axis A4 by means of respective deformable couplings.

With reference to FIG. 3, the bridge 12 comprises an axle 13, which extends along the axis A4, and an arm 14, which is integral to the axle 13, extends crosswise to the axle 13 in the area of the middle line of the axle 13 and has a sleeve 15 in the area of its free end so that it can be articulated to the chassis 2 around the axis A3. A free end of each shock absorber 5 is articulated to the bridge 12, in particular to an end portion of the axle 13.

The bridge 12 is articulated to the chassis 2 by means of an elastic coupling, which allows the bridge 12 both to rotate around the axis A3 and to be tilted along the axis A3. In other words, the axle 13 extending along the axis A4 can rotate around the axis A3 remaining parallel to the axis A3, can assume skew positions relative to the axis A3 and can make both movements indicated above.

With reference to FIG. 2, the elastic coupling between the bridge 12 and the chassis 2 entails fitting the sleeve 15 around a shaft 16, whose ends are constrained to the chassis 2, and an elastic sleeve 17 arranged between the sleeve 15 and the shaft 16. The elastic sleeve 17 is mainly made of rubber or of another deformable material. With reference to FIGS. 4 and 5, the bridge 12 is connected to a respective carriage 3 by means of an elastic joint, which enables a ball-like movement. According to FIG. 5, each elastic coupling comprises an elastic sleeve 18, which is fitted onto an end of the axle 13, and two caps 19, which enclose the elastic sleeve 18 on opposite sides and are mounted on a respective carriage 3. The outer surface of the elastic sleeve 18 is defined by two truncated cones in mutual contact along their main surface, whereas the caps 19 have an inner surface with the shape of a truncated cone ad are substantially complementary to the elastic sleeve 18. This configuration resembles a ball coupling and allows for an elastic deformation in all directions between the bridge 12 and the carriage 3.

Alternatively to the aforesaid elastic coupling, the bridge 12 can be connected to a carriage 3 by means of a "rigid" ball joint, which allows for an axial compensation movement along the axle 13 when the axle 13 assumes a skew configuration relative to the pitch axis A2.

With reference to FIG. 3, the tracked vehicle 1 comprises two powertrain systems 20, each of which is configured to operate a respective driving wheel 7, is partly housed inside a respective elongated structure 6 and comprises a respective shaft 21 coinciding with the pitch axis A2.

Furthermore, each powertrain system 20 comprises a mechanical transmission 22 housed in the respective elongated structure 6 to connect the shaft 21 to the respective driving wheel 7. In the case shown herein, the mechanical transmission 22 comprises a gear train. Each powertrain system 20 comprises a respective engine 23, which is configured to rotate the respective shaft 21 and is housed inside the chassis 2, which is hollow. In this case, the engines 23 are electric motors.

With reference to FIG. 6, each front idle wheel 8 is mounted on a shaft 24 coupled to the elongated structure 6 in a sliding manner in a direction substantially parallel to the moving direction D1 in a guide 25 of the elongated structure 6 and is supported by a slide 26 connected to the elongated structure 6 by means of linear actuators 27.

The tracked vehicle 1 is configured to control—in an independent manner—the position of each carriage 3 relative to the chassis 2 by means of the shock absorbers 5 and the tension of each track 4 by means of the linear actuators 27. To this aim, the tracked vehicle 1 comprises a control system shown in FIG. 7, which comprises a hydraulic circuit 28 and a control unit 29. The hydraulic circuit 28 comprises a pump 30, a hydraulic distributor 31 connected to the shock absorbers 5 for the active control thereof and the linear actuators 27, in this case hydraulic actuators, to control the position of the idle wheels 8 and the tension of the tracks 4.

Figures 8, 9, 10, 11:
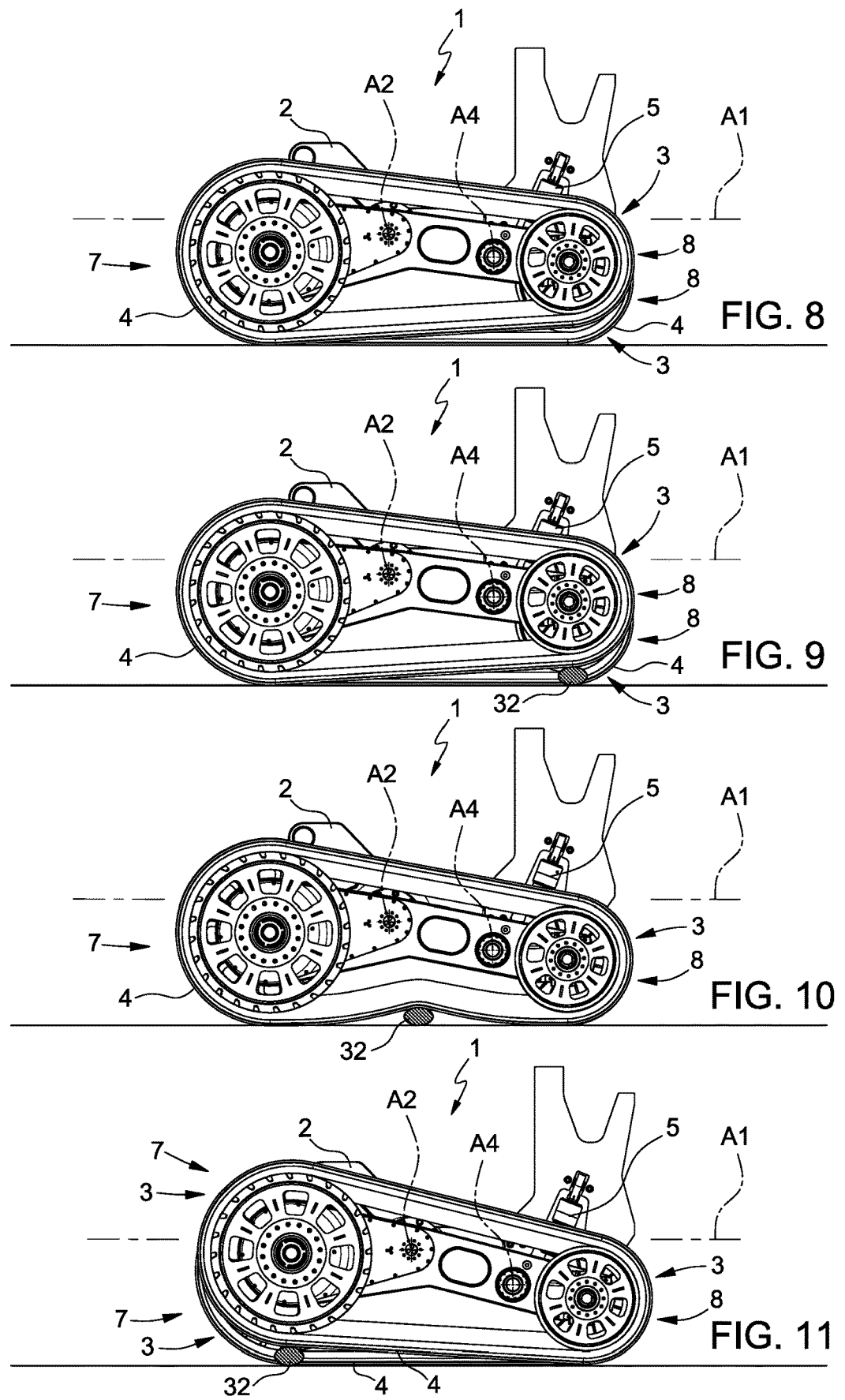

In use, the tracked vehicle 1 is extremely versatile: in FIG. 8, the tracked vehicle 1 is shown in a steering configuration, in which a carriage 3 in the background completely rests on the ground, whereas the carriage 3 in the foreground is partially rotated around the pitch axis A2 so as to reduce the contact surface of the track 4 in the foreground to a very limited zone in the area of the driving wheel 7. While steering, the track 4 in the foreground remains inactive or is moved at a lower speed than the speed of the opposite track 4, whereas the opposite track 4 is operated so as to steer the tracked vehicle 1 relative to the reduced contact surface. In this way, the tracked vehicle 1 limits the slip on the ground and, as a consequence, the energy dispersed in friction as well as the deterioration of the soil.

The sequence of FIGS. 9 to 11 shows the tracked vehicle 1 in different phases while moving past an obstacle 32 arranged along the path of the sole carriage 3 visible in the foreground.

In FIG. 9, the carriage 3 in the foreground is partially rotated around the pitch axis A2 so as to place the idle wheel 8 on the obstacle 32.

In FIG. 10, the obstacle 32 is arranged between the driving wheel 7 and the idle wheel 8 and the obstacle deforms the track 4. The deformation of the track 4 is enabled by the fact that, in this phase, the tension of the track 4 is reduced.

In FIG. 11, the carriage 3 in the foreground is rotated clockwise relative to the chassis 2 and relative to the position of FIG. 10 so as to allow the driving wheel 7 to easily move past the obstacle 32.

In case the obstacle 32 extends over the entire width of the tracked vehicle 1, both carriages 3 pitch around the pitch axis A2 and loosen the tension of the respective tracks 4.

Finally, the invention can evidently comprise further variants to the embodiments described herein, which are included in the scope of protection set forth in the appended claims.

The invention claimed is:

1. A tracked vehicle for use in agriculture, the tracked vehicle comprising:

a chassis extending along a longitudinal axis;

two carriages, which are arranged on opposite sides of the chassis and are configured to support their respective tracks and are articulated to the chassis about a pitch axis; and—two shock) absorbers, each of which is connected to the chassis and to a respective carriage and is adjustable in position to control the position of the respective carriage with respect to the chassis, wherein each carriage comprises an elongated structure supporting in a rotatable manner at the opposite ends a driving wheel and an idle wheel; said elongated structure being articulated to the chassis about said pitch axis, the pitch axis being closer to the driving wheel than to the idle wheel, wherein each elongated structure is at least partly hollow; and two powertrain systems, each of which is configured to drive a respective driving wheel and is partly housed within the respective elongated structure.

2. The tracked vehicle as claimed in claim 1, wherein each powertrain system comprises a respective shaft coinciding with the pitch axis.

3. The tracked vehicle as claimed in claim 2, wherein each powertrain system comprises a mechanical transmission housed in the respective elongated structure to connect the shaft to the respective drive wheel.

4. The tracked vehicle as claimed in claim 2, wherein each powertrain system comprises a respective engine configured to rotate the respective shaft, said engine being an electric motor.

5. The tracked vehicle as claimed in claim 4, wherein said chassis is hollow so as to house two motors arranged along the pitch axis in proximity of the respective carriages.

* * * * *